United States Patent [19]

Dujari

[11] Patent Number: 5,038,275

[45] Date of Patent: Aug. 6, 1991

[54] STATUS TRANSFER STRUCTURE WITHIN A DATA PROCESSING SYSTEM WITH STATUS READ INDICATION

[75] Inventor: Vineet Dujari, Santa Clara, Calif.

[73] Assignee: Advanced Micro Devices, Inc., Sunnyvale, Calif.

[21] Appl. No.: 475,514

[22] Filed: Mar. 2, 1990

Related U.S. Application Data

[63] Continuation of Ser. No. 255,554, Oct. 7, 1988, abandoned.

[51] Int. Cl.⁵ .............................................. G06F 13/38
[52] U.S. Cl. ................................ 364/200; 364/238.3; 364/247.3
[58] Field of Search ... 364/200 MS File, 900 MS File

[56] References Cited

U.S. PATENT DOCUMENTS

| | | | |
|---|---|---|---|
| 4,106,091 | 8/1978 | Hepworth | 364/200 |
| 4,325,117 | 4/1982 | Parmet | 364/200 |
| 4,400,773 | 8/1983 | Brown | 364/200 |
| 4,456,970 | 6/1984 | Catiller et al. | 364/900 |
| 4,593,380 | 6/1986 | Kocher | 364/900 |
| 4,716,523 | 12/1987 | Burrus | 364/200 |
| 4,750,113 | 6/1988 | Buggert | 364/200 |
| 4,901,232 | 2/1990 | Harrington et al. | 364/200 |
| 4,910,705 | 3/1990 | Boioli et al. | 364/900 |

*Primary Examiner*—Lawrence E. Anderson
*Attorney, Agent, or Firm*—Lowe, Price, LeBlanc & Becker

[57] ABSTRACT

A system for transferring the status information between a peripheral controller and central processing unit (CPU) is disclosed. The system utilizes three registers and an interrupt pin for determination of the presence of a STATUS VALID bit. If the STATUS VALID bit is set, then a STATUS OVERFLOW bit is set by the peripheral controller. If the STATUS VALID bit is not set, the peripheral controller updates the status information and sets the STATUS VALID bit. Through the use of this transfer system much of the complexity associated with known systems is eliminated without the concomitant loss in processing speed.

4 Claims, 6 Drawing Sheets

STATUS TRANSFER STRUCTURE WITHIN A DATA PROCESSING SYSTEM WITH STATUS READ INDICATION

RELATED PATENT APPLICATION

This patent application is a continuation of the previously filed patent application, Ser. No. 07/255,554; filed Oct. 7, 1988, now abandoned.

FIELD OF THE INVENTION

The present invention relates generally to systems which employ a central processing unit and a peripheral controller to control a peripheral device and more particularly to a system that controls optical and magnetic disk drives, printers, and the like using peripheral controllers.

BACKGROUND OF THE INVENTION

In earlier data processing systems, the Central Processing Unit (CPU) directly controlled the peripheral devices in the system. These systems employed a general purpose CPU for data processing functions, this CPU also controlled different types of peripherals. Such an implementation was not very efficient because a CPU is generally designed to be an efficient data processor and is not very suitable for peripheral control functions. The control function requirements of different peripheral devices attached to a system are too varied to permit efficient control using a general purpose CPU. Also, these control functions were performed using software instructions and hence were slow.

The next generation of systems utilized a peripheral controller as an interface between the CPU and the peripheral device that was to be controlled. In these systems, peripheral controllers were mostly designed to standardize the physical interface of the peripheral as viewed by the CPU, however, all intelligence required to operate the peripheral still resided in the CPU control programs.

In subsequent systems, more and more of the intelligence required to control the peripheral device was designed into the peripheral controller.

What is meant by intelligence in the context of this application is that the majority of decisions concerning the operation of the device are performed by the peripheral controller. These peripheral controllers were specialized in that a peripheral controller was designed to control one type of peripheral device, e.g. a disk controller was designed to control a disk drive, a printer controller was designed to control a printer, etc.

Since the peripheral controller was specialized, it could be designed to control the associated peripheral device much more efficiently. Also, many of the peripheral control functions could be implemented in the peripheral controller using hardware logic resulting in faster operation as compared to slower software control programs. This also permitted the CPU to perform data processing functions faster.

To more particularly explain the problems associated with known systems, reference will now be made to a typical data processing system. Such a system comprises a CPU with an associated peripheral controller coupled to the CPU. Coupled to the controller is a peripheral device such as an optical disk, magnetic disk, or the like.

Before explaining the typical sequence of operations, a disk subsystem is explained here. Disks store data on a physical media comprising of one or more storage surfaces, each surface is divided into tracks, these tracks are further divided into entities called sectors where blocks of data can be stored. Each sector consists of two major components, a header portion that identifies a sector uniquely; and a data portion, where a block of data can be stored.

The header portion typically consists of a surface number and a track number on which the sector is located, and a unique sector number assigned to it. An error detecting check code is usually appended to this header information to ensure that the header information recovered from the disk during the read operation is correct.

The data portion of the sector consists of a block of data. Typical block sizes of a sector are 256, 512, or 1024 bytes, although other sizes can also be implemented. Also, the data block size in a given disk is the same, although it can be varied from sector to sector. Usually, a check code, which can be error detecting or error detecting and correcting in nature, is appended to the block of data as it is written to the disk.

This check code is used by the peripheral controller to determine if an error occurred in the block of data during retrieval of data. If the check code is error detecting and correcting, the erroneously recovered data can be corrected by means of some error correcting mechanism. Data blocks can be read or written in integral multiple of sectors.

In a first known operating procedure, the peripheral controller can operate on one sector for each command. Normally, the peripheral controller is in an idle state and the CPU issues a command, for example, a READ ONE SECTOR command to the peripheral controller. Along with that command, the CPU will also provide the controller with command parameters, e.g. the surface, the track and the sector number of the sector to be read. Thereafter, the controller enters a busy state where it performs the read function specified by the CPU.

It begins by searching for the specified sector, and when and if the specified sector is found, the data from this sector is retrieved by the CPU using programmed input/output sequence. The peripheral controller then prepares a status code for the CPU in its status register and sends a signal to the CPU that the specified function has been completed. After this, the peripheral controller enters the idle state again and the status can be retrieved by the CPU.

In this type of procedure, since the CPU retrieves the status information only when the peripheral controller is idle, there is no chance of any contention between the CPU and the peripheral controller. What is meant by contention is that there is no chance that the CPU will read the status information from the peripheral controller at the same time that the peripheral controller is attempting to write it.

However, as more complex systems developed, this operating procedure became inadequate. More particularly, it became important that the peripheral controller should be able to perform multiple sector operations without assistance from the CPU. It must be able to perform error detection and correction operations without assistance from the CPU. It must also be able to perform data transfer operations without assistance from the CPU.

To maximize the overall throughput of the systems, many of these tasks must be performed at the same time. For example, while a previously read error-free sector data is being transferred, a correction operation can proceed on a sector of data that was recovered with error, and a new sector of data can be retrieved from the disk at the same time.

In other words, the system must be able to perform various tasks simultaneously. It is also important that the controller provide status information on a regular basis to the CPU to allow the CPU to adequately monitor the operation of the peripheral controller.

As an alternative to the above mentioned operating procedure, procedures are known in which the peripheral controller commands can be chained. In such procedures, a significant area is provided in the memory of the CPU such that the status of each of there commands can be placed in the memory as the peripheral controller operation proceeds.

In such a system, the CPU issues a chain of commands which will cause multiple events to happen in the peripheral controller. As the status information is generated after each event, this status is loaded into the pre-designated area of the memory where it can be examined by the CPU. This alternative procedure takes care of the contention problem outlined above, however, it requires a more complex CPU bus structure such as a multi-master CPU bus. It also requires large amount of memory to be set aside for status information.

In many systems, it is best to design the peripheral controller to perform as many complex functions as possible and keep the CPU functions as simple as possible. This allows very cheap CPU devices to be used in the peripheral subsystem and results in a more cost-effective solution. The two major requirements of the second operating procedure outlined above--more complex CPU and large amount of memory--are in direct opposition to the desirable characteristics of the cost-effective solution.

Accordingly, what is needed is a system that includes a CPU, a peripheral controller and a peripheral device in which contention problems are minimized. It is also important that the system be one in which the CPU is a relatively inexpensive part of the overall system. It is also important that the system be one in which the peripheral controller does not corrupt any status information generated during its operation. Accordingly, the present invention provides a system which overcomes the above-mentioned problems.

SUMMARY OF THE INVENTION

In accordance with present invention, there is provided a system for transferring status information from a peripheral controller to a central processing unit (CPU). The system comprises providing a command from the CPU to the peripheral controller, requesting the controller to perform an operation in response to the command, and detecting if a STATUS VALID bit in the peripheral controller is set.

If the STATUS VALID bit is set, a STATUS OVERFLOW bit will be set in the peripheral controller. In the STATUS VALID bit is not set, the status information will be updated and the STATUS VALID bit will be set in the peripheral controller. Through the use of this system, the peripheral controller can perform multiple tasks simultaneously, and still transfer status information to the CPU. Also through this system, the peripheral controller does not require any memory for reporting status information.

DETAILED DESCRIPTION

The present invention comprises a novel method and apparatus for transferring the status information between a peripheral controller and a CPU in a data processing system. The following description is presented to enable any person skilled in the art to make use of the invention and is provided in the context of particular application and its requirements. Various modifications to the embodiment will be readily apparent to those skilled in the art and the generic principles defined herein may be applied to other embodiments and applications without departing from the spirit and scope of the present invention. Thus, the present invention is not intended to be limited to the embodiment shown but is to be accorded the widest scope consistent with the principles and features disclosed herein.

Figure 1:
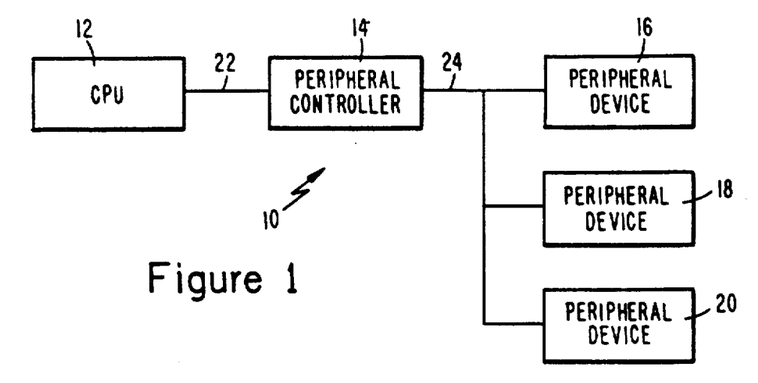
FIG. 1 is a block diagram of a typical data processing system.

A typical data processing system 10, such as that shown in block diagram form in FIG. 1 includes a central processing unit (CPU) 12, which is in communication with a peripheral controller 14 via line 22. The peripheral controller 14 in turn is in communication with a plurality of peripheral devices 16, 18, and 20 via line 24. The peripheral devices 16-20 can be a variety of devices such as printers, optical disks, magnetic disks and the like. The peripheral 12 controller 14 under control of the CPU 12 provides signals to the peripheral devices 16-20 so that the peripheral devices 16-20 can execute there various operations.

The peripheral devices 16-20 also provides signals to peripheral controller 14 via line 24 that indicate the various states of those operations. The peripheral controller 14 in turn provides signals to the CPU 12 via line 22 that indicate the status of the various operations. This status information is then utilized by the CPU 12 to either initiate a new operation by the peripheral controller 14 or is used to initiate an examination of the operation of the peripheral controller 14 in the instance that the operation of the peripheral device or devices 16-20 are not operating properly.

Figure 2:
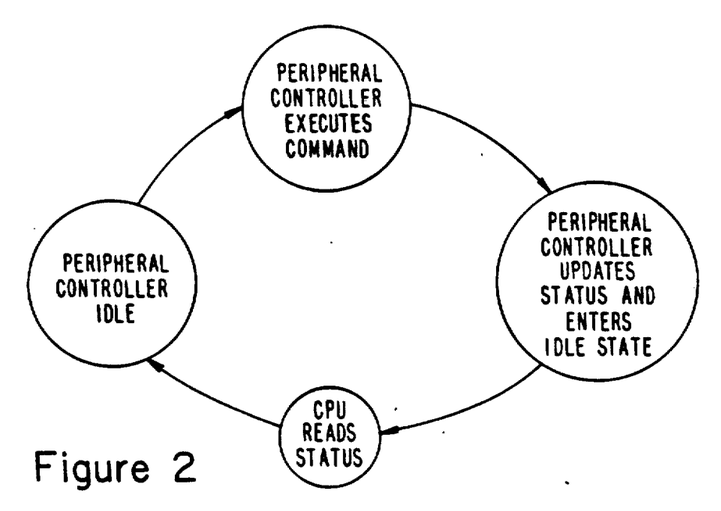
FIG. 2 is a state diagram of a first previously known arrangement for providing the status information of the peripheral controller in a system as shown in FIG. 1.

The verification of this status information is oftentimes the time limiting factor in the operation of the data processing system 10. To more particularly point out this problem in known data processing systems refer now to FIG. 2. FIG. 2 is a state diagram representation of a previously known system in which the CPU 12 can interrogate the status of the peripheral controller 14 during the operation of the data processing system 10.

In this system the CPU 12 provides a command to the peripheral controller 14 which causes the peripheral controller 14 to execute the particular operation. Thereafter the controller 14 will update the information within status registers (not shown) and will enter the idle state. The CPU 12 will then read the status of the register and thereafter will enable the controller 14 to perform a new operation. The system depicted in FIG. 2 has no chance for contention in the status area of the processing system 10. In this type of system, the peripheral controller 14 is always idle when the CPU 12 is reading the status information. The peripheral controller 14 writes to the status area when it is executing and the CPU 12 will not read the status area until it is told to do so by the idle signal from the peripheral controller 14.

However, the primary problem with this type of arrangement is that it is too slow for many applications. In many applications, multiple tasks must be performed simultaneously to increase the efficiency of the system 10. If the exchange of status is very frequent, then the arrangement shown in FIG. 2 would take a relatively long amount of time in those instances where multitask commands are receives from the CPU 12.

Figure 3:
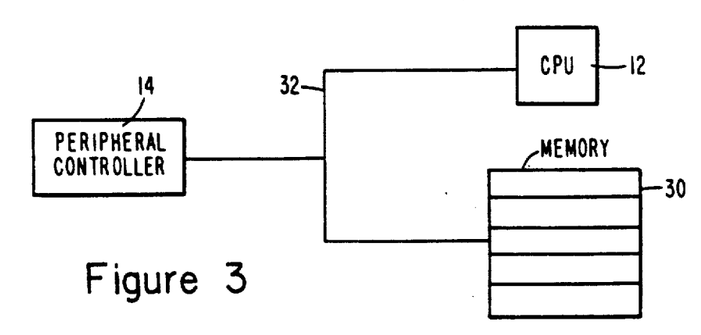
FIG. 3 is a block diagram of a second previously known arrangement for providing the status information of peripheral controller in a system as shown in FIG. 1.

An alternative to this type of arrangement is shown in FIG. 3. Shown in this arrangement is the peripheral controller 14 and the CPU 12 coupled to a bus line 32 and a memory 30 coupled to the CPU 12 and controller 14. In this second arrangement, the peripheral controller 14 and the CPU 12 can control the status area within a memory 30. In such a system, the CPU 12 issues a chained command to the peripheral controller 14 which will cause multiple tasks to happen simultaneously. As status information is generated after each event, it is loaded into the memory 30 where it can be the examined by the CPU 12.

A data processing system that utilizes the arrangement of FIG. 3 would avoid the time problem associated with the arrangement of FIG. 2 and would also prevent any contention between the CPU 12 and the peripheral controller 14 when accessing the status area. However, there are problems with the above-mentioned second arrangement.

Firstly, this type of arrangement would require bus master capability from both the peripheral controller 14 and the CPU 12. To more fully explain the problems associated with this arrangement refer now to the following discussion.

In the arrangement of FIG. 2 the master device, (the CPU 12) controls the access that the slave device (the peripheral controller 14) has to the bus. On the other hand in the arrangement as described in FIG. 3, both the CPU 12 and the peripheral controller 14 have to control access to the bus at various times, hence, they are both master devices. Accordingly, a system such as that shown in FIG. 3 would require multiple bus master capability. In this multiple bus master control arrangement, the overall complexity of the system is significantly increased due to the need of a bus arbitration mechanism to avoid bus contention problems.

Finally, in the above mentioned arrangement, the CPU will be a complex device. In many systems, the CPU 12 should be a simple device so that a low-cost standard CPU device can be utilized to ensure that overall system costs are minimized. Hence, although the system of FIG. 3 has some advantages over previously known systems, it has the above mentioned problems which are unacceptable in many applications.

Therefore, what is required is an arrangement for transferring the status information between a CPU 12 and a peripheral controller 14 that overcomes the problems associated with previously known procedures.

The present invention comprises a handshake mechanism between the CPU and the peripheral controller. The CPU examines registers within the peripheral controller to determine whether the system is operating properly. As will be explained in more detail hereinbelow the peripheral controller utilizes a set of registers and an interrupt pin to send the status of its operation to the CPU. Through the use of this mechanism, the CPU can be a standard part which is a relatively inexpensive part of the system. Furthermore through the use of this system many tasks can proceed simultaneously within the peripheral controller.

By providing the above-identified status structure, the peripheral controller has increased flexibility in reporting the various conditions of the controller to the CPU. The CPU in many systems will "poll" the peripheral controller to examine the operation of the peripheral controller. In other systems, the peripheral controller may interrupt the CPU when status information is to be transferred. The system according to the present invention is designed such that the system can be operated in a polled, interrupt-driven or mixed environment.

The present invention has the further advantage of requiring only one master device (the CPU) which will further reduce the cost and complexity of the system. To more particularly explain the advantages of the present invention refer now to FIG. 4.

Figure 4:
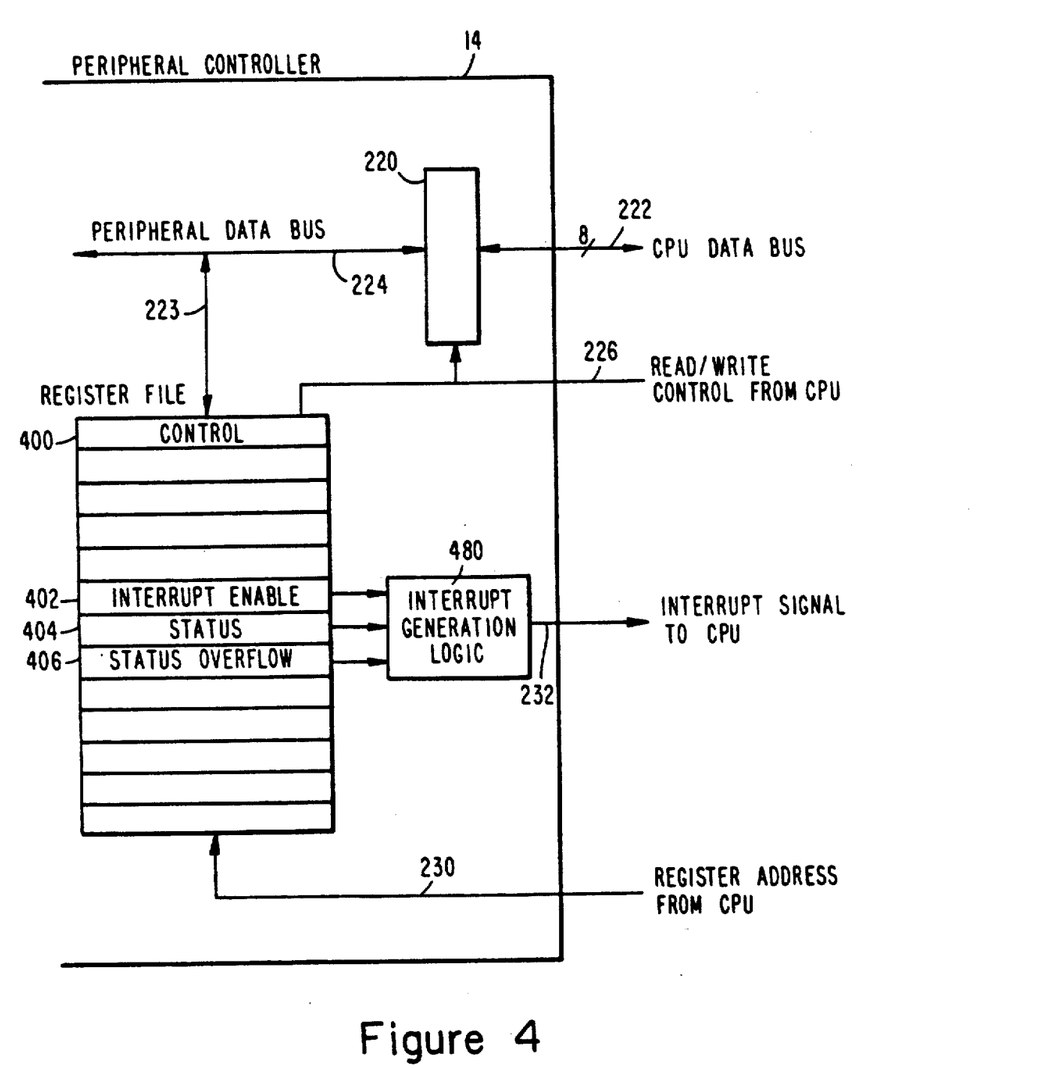
FIG. 4 is a block diagram of the status structure of the peripheral controller of the present invention.

FIG. 4 is a block diagram of the status structure of peripheral controller 14. For purposes of clarity the features that are important to allow one of ordinary skill in art to understand the present invention are described.

The peripheral controller includes a data buffer. The data buffer isolates the CPU data bus 222 and the peripheral controller data bus 224 when no operation is in progress. The data buffer 220 becomes an output buffer during the read operation of CPU 12. The data buffer 220 becomes an input buffer during the write operation of the CPU 12. The data buffer 220 also receives control signals from CPU 12 via control line 226.

The peripheral data bus 222 via bus 223 as well provides signals to register file 400. Register file 400 includes a number of registers. The CPU 12 addresses the register file 400 via control line 230. Registers 402–406 provide signals to interrupt generation logic circuit 480 which in turn provides an interrupt signal to CPU 12 via line 232. In this embodiment, register 402 is the INTERRUPT ENABLE register, register 404 is the STATUS register and register 406 is the STATUS OVERFLOW register.

Figure 5:
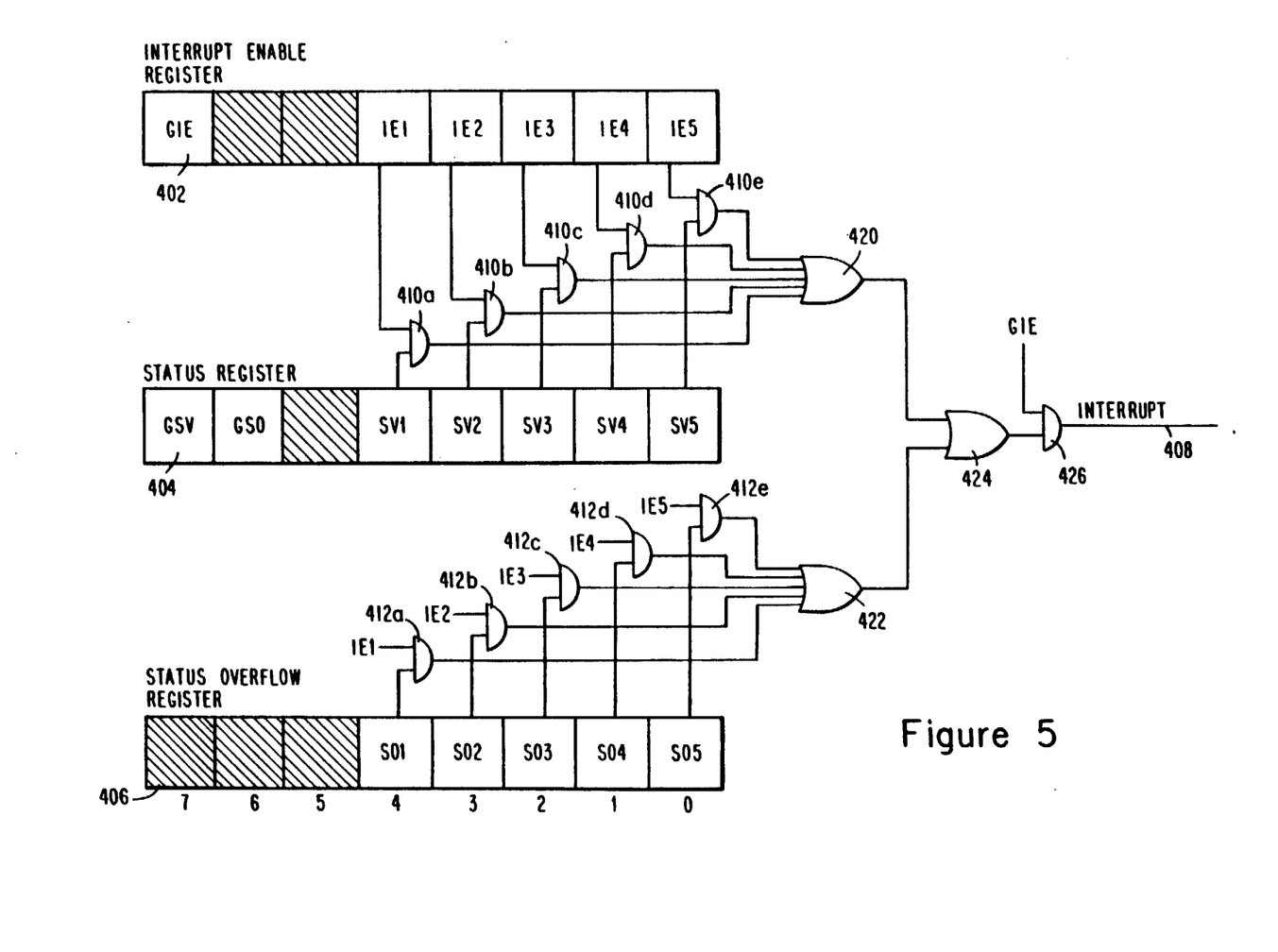
FIG. 5 is a block diagram of the interrupt hardware of the peripheral controller of the present invention.

Referring now to FIG. 5 which is a block diagram of interrupt generation logic circuit 480 and the registers 402, 404 and 406 the peripheral controller 14 utilizes these three registers 402–406 and an interrupt pin 408 to send status information to the CPU 12. In such a system many tasks can be performed in the peripheral controller simultaneously. There are a plurality of logic gates coupled to the registers 402, 404, and 406 to provide certain output signals to an INTERRUPT pin 408. In this embodiment, AND gates 410a–410e are coupled between the STATUS register 404 and the INTERRUPT ENABLE register 402 (SV1–SV5 and IE1–IE5). AND gates 412a–412e are coupled between the INTERRUPT register and the STATUS OVERFLOW register (SO1–SO5 and IE1–IE5).

In this embodiment, the operation of five sets of corresponding bits are shown to provide clarity to the following discussion. It should be understood, however, that the other bit locations can be coupled to the AND gates and their use would be within the spirit and scope of the present invention.

The outputs of the AND gates 410a–410e are provided to the inputs of OR gate 420. The outputs of the AND gates 412a–412e are provided to the inputs of OR gate 422. The outputs of the OR gates 420 and 422 are provided to the inputs of OR gate 424. The output of the OR gate 424 is provided to one input of AND gate 426.

The bit located in GLOBAL INTERRUPT ENABLE (GIE) bit location is provided to the other input of AND gate 426. Finally, the output of the AND gate 426 drives the INTERRUPT pin 408.

The above identified registers 402–406 operate cooperatively to allow for maximum flexibility in the transfer of status information between the CPU 12 and the peripheral controller 14. It should be understood that each of the registers 402–406 has corresponding bit locations. For example IE1, SV1 and SO1 are corresponding bit locations in the INTERRUPT ENABLE register 402, the STATUS register 404 and the STATUS OVERFLOW register 406 as are IE2, SV2 and SO2 etc.

For the purpose of this discussion, only the relevant bits of information within each register is shown and discussed in describing the operation of the status reporting structure of the peripheral controller 14. It is well recognized by one of ordinary skill in the art that a different number of bits can be utilized in the registers and that use would be within the spirit and scope of the present invention. It should also be recognized that the bit locations within the registers could be different and the resulting system would still be within the spirit and scope of the present invention. The operation of the various parts of the system will now be described in more detail hereinbelow.

Interrupt Enable Register

The INTERRUPT ENABLE register 402 controls the activation of the interrupt pin 408 when a status is generated by the peripheral controller 14. The IE register 402 is written to only by the CPU 12. It is never modified by the peripheral controller 14.

Within the IE register 402 is a Global Interrupt Enable (GIE) bit location. If this bit is set, then the peripheral controller 14 will generate interrupt signals. If the bit is not set, the controller 14 will not generate interrupt signals. There are other INTERRUPT ENABLE bit locations labeled IE1-IE5. These locations contain the individual status interrupt enable (IE) bits. When an IE bit is set, the peripheral controller will generate an interrupt signal responsive to the corresponding bit location in the STATUS register 404. When the bit in the bit location of the IE register is not set, the interrupt signal will not be generated responsive to the corresponding bit location the STATUS register 404.

Status Register

The STATUS register 404 is utilized by the peripheral controller 14 to inform the CPU 12 when valid status information is available in the various status registers (not shown) The STATUS VALID (SV) bit locations designated SV1–SV5 each indicate that the peripheral controller has updated the corresponding status registers with new status information and the CPU 12 can read that status information. These bit locations are reset when the CPU acknowledges reading the status locations by overwriting those bit locations.

The GLOBAL STATUS VALID (GSV) bit location is set if any SV bit location along with its corresponding IE bit location is set. The GSV bit is reset if no SV bit is set and no corresponding IE bit is set. The GLOBAL STATUS OVERFLOW (GSO) bit location is set if any STATUS OVERFLOW (SO) bit is set and the corresponding IE bits is set. The GSO bit is reset when no SO bit and no corresponding IE bit are set. The peripheral controller 14 will also activate the interrupt pin 408 any time this bit is set and the GIE bit is set. This bit location can only be read by the CPU 12, writing to this bit location will have no effect.

Status Overflow Register

The STATUS OVERFLOW register 406 is utilized by the peripheral controller to provide to the CPU 12 an indication that there is an overflow condition. An overflow signal will typically indicate that the peripheral controller 14 could not report particular status information during its operation because the CPU 12 had not acknowledged the retrieval of previously resorted status. The STATUS OVERFLOW (SO) bit locations (SO1-SO5) are set when the peripheral controller 14 can not update the appropriate status area.

In this embodiment, bits SO1 through SO5 are such that they can only be set by the peripheral controller 14 and can only be reset (cleared) by the CPU 12. Before a status area is updated, the peripheral controller will determine if the corresponding SV bit is reset (i.e. the CPU 12 has read the previously generated status). If the SV bit is reset, the peripheral controller will update the corresponding status area and set the bit.

The CPU 12 will then read the bit location of this register and determine which status area need to be read. After reading the status area, the CPU 12 will reset the appropriate bit in the SO register 406 to acknowledge reading the appropriate status area.

If the peripheral controller 14 wants to update the status area and finds that the corresponding SV bit is already set (i.e. the CPU 12 has not read the previously generated status), the peripheral controller 14 will set the corresponding SO bit and the peripheral controller 14 will lose the status to be written. Setting of any SO bit will also activate the GSO bit and the interrupt pin 408 in the pin 408 is enabled.

This system provides the mechanism for the peripheral controller 14—CPU 12 system to acknowledge the status information in a guaranteed manner. In this system, the CPU 12 will not acknowledge a status valid signal without reading the corresponding status. For example, if the peripheral controller has updated status area 1 (and set the SV1 bit), the CPU 12 can then read the SV register and determine that the status area corresponding to bit location SV1 can be read. The peripheral controller 14 is free to update bit locations corresponding to the other status areas. Hence, the peripheral controller is only precluded from updating the area that the CPU 12 is reading.

Figure 6:
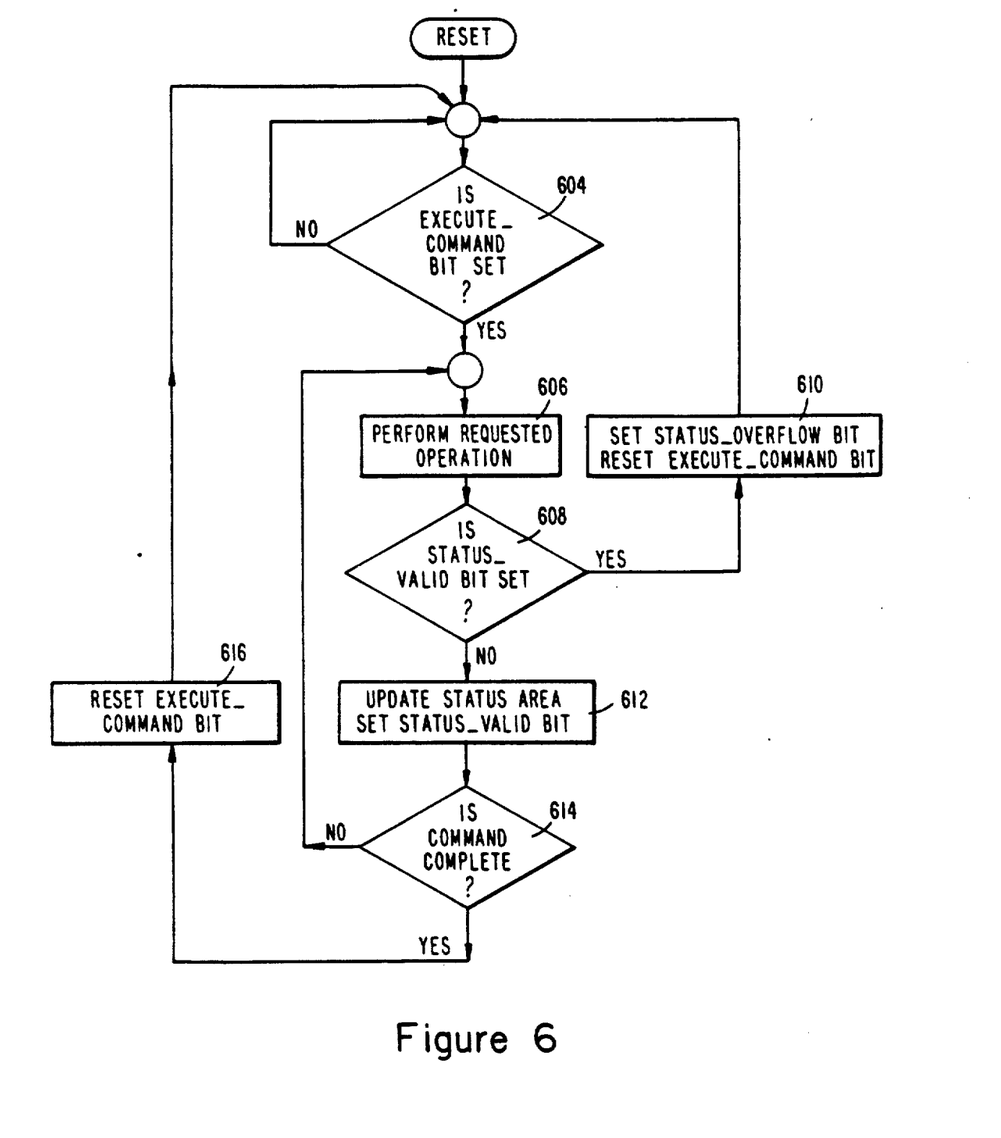
FIGS. 6-8 are flow charts of the operation of the peripheral controller and CPU of the present invention.
Figure 7:
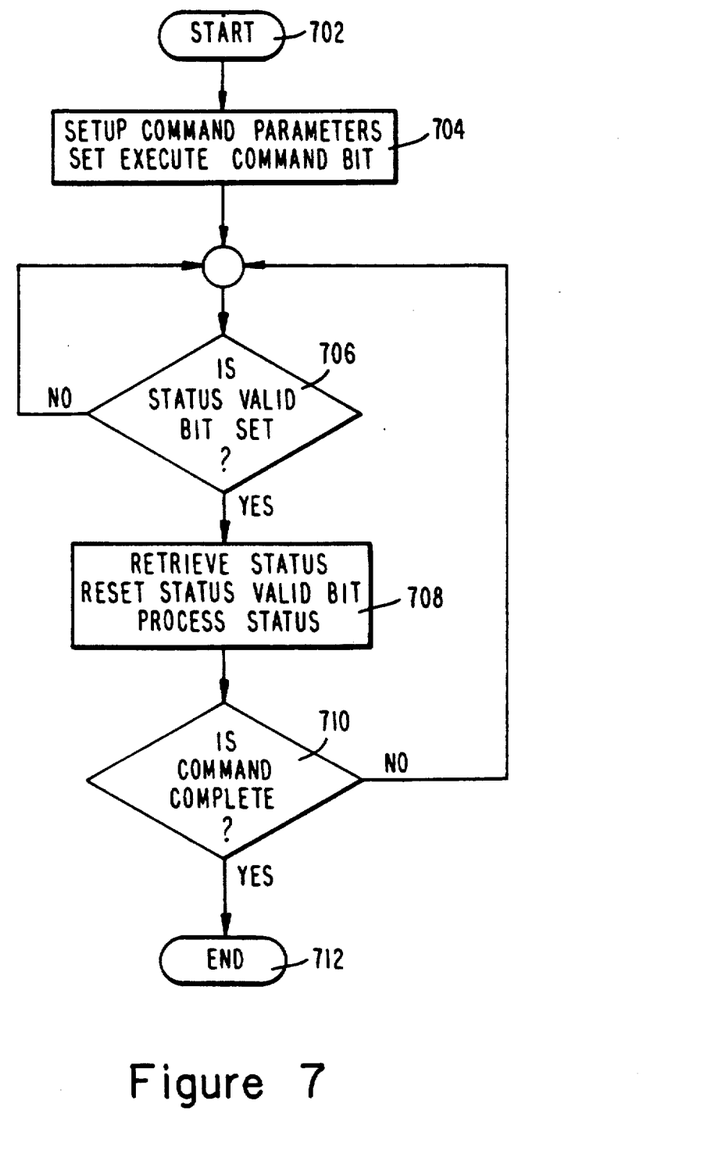

To more clearly depict interaction between the CPU 12 and the peripheral controller 14 refer now to FIGS. 6 through 8 which are flow charts which represents the transfer of status information between the peripheral controller 14 and CPU 12 through use of software techniques.

Referring now to FIG. 6, what is depicted is the operation of the peripheral controller during the status transfer operation. Initially, it must be determined whether the command bit is active (604). If it is active, the requested operation will be performed by the controller 14 (606). After the operation is performed, the controller will determine whether the STATUS VALID bit is set (608). If the bit is set then as has been before mentioned, the STATUS OVERFLOW bit is set (610). If the STATUS VALID bit is not set, the status area is updated and the STATUS VALID bit is set (612). If the command is complete (614) then the reset sequence takes place again (616), on the other hand if the command is not complete, the operation continues.

Referring now to FIG. 7, what is shown is the operation of the software associated with CPU 12 in parallel with the peripheral controller 14 when the CPU 12 is polling the peripheral controller 14. In this system, the peripheral controller 14 operation will be initiated (702). The command parameter is then set up and EXECUTE COMMAND bit is set (704).

The CPU 12 will then read the STATUS VALID bit (706), if it is set, the CPU 12 will read the status information and clear the STATUS VALID bit (708). If the STATUS VALID bit is not set, then the process is repeated until the peripheral controller has set the STATUS VALID bit. After the STATUS VALID bit is cleared and if the command is complete (710), then the CPU 12 will exit the system (612). If the command is not complete, a new STATUS VALID bit is reviewed.

Figure 8A:
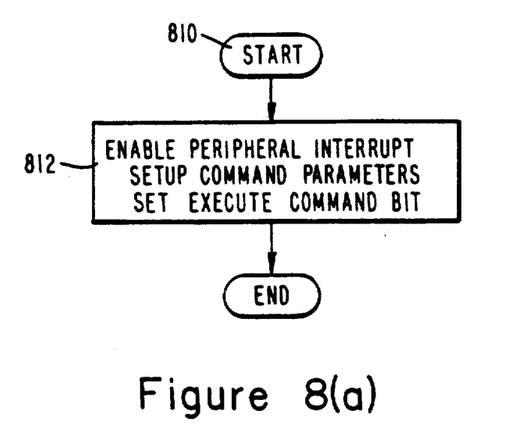

FIG. 8 shows the operation of the software associated with CPU 12 when the CPU 12 is interrupt driven by the peripheral controller 14. Initially referring to 8a, the CPU 12 must start (810) the peripheral controller operation. Accordingly, the peripheral interrupt is enabled, the command parameters are set up and the EXECUTE COMMAND bit is set 812.

Figure 8B:
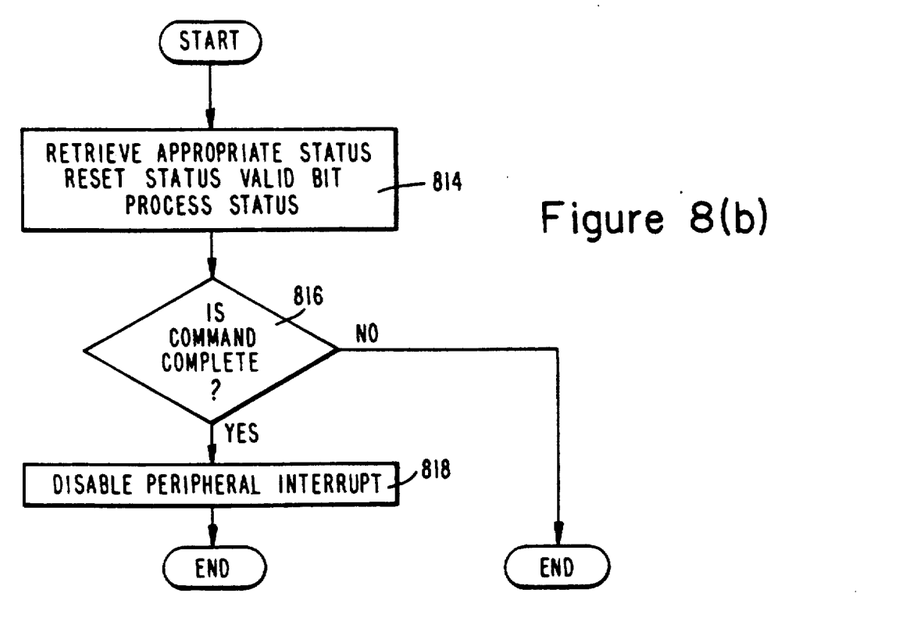

Thereafter, in the interrupt service routine 8b, the CPU 12 retrieves the appropriate status information, resets the STATUS VALID bit and processes the status information (814). Thereafter, if the command is complete (816), the CPU will disable the peripheral interrupt (818).

Accordingly, the system of the present invention provides an efficient and reliable method for transferring status information between a CPU and a peripheral controller in either the polled or interrupt driven mode. Through the use of the present invention, only one master device is needed for the bus. The present invention has the further advantage of having the processing speed of systems that utilizes multiple master bus control. Accordingly, this system is less expensive and more flexible than previously known systems.

The above described embodiment can be modified in a variety of ways and those modifications would still be within the spirit and scope of the present invention Thus, while this invention has been disclosed by means of a specific illustrative embodiment, the principles are capable of a wide range of modification by those of ordinary skill in the art within the scope of the following claims.

What is claimed is:

1. A method for transferring status information from a peripheral controller over a data bus to a central processing unit (CPU), said peripheral controller having a register file addressable by said CPU over an address bus for determining the status of a register information, said method comprising the steps of:

(a) providing a command from the CPU to the peripheral controller over the data bus to perform a requested operation;
(b) performing the requested operation by said controller;
(c) detecting if a status valid bit is set in a first register of said register file;
(d) setting a status overflow bit in a second register of said register file if the status valid bit is set to indicate that the peripheral controller could not report status information during its operation because the CPU had not acknowledged the retrieval of previously reported status;
(e) storing status data in a third register of said register file if said status valid bit is not set; and
(f) setting, subsequent to step c, said status valid bit in said first register of said register file.

2. A method for transferring status information from a peripheral controller to a central processing unit (CPU) over a CPU data bus, said peripheral controller having a register file comprising three interacting registers coupled to a logic means, including an interrupt enable register, a status register, and a status overflow register whose bit locations have corresponding bit locations in each other register of said register file to indicate that the peripheral controller could not report status information during its operation because the CPU had not acknowledged the retrieval of previously reported status, said method comprising the steps of:

(a) providing a command from the CPU to the peripheral controller to perform a requested operation;
(b) performing the requested operation by said controller;
(c) receiving, simultaneously with step b, a register address designating a register of said register file from said CPU;
(d) supplying, simultaneously with step b, information stored in said designated register to said CPU data bus;
(e) detecting if a status valid bit has been set in said register file;
(f) updating status information in said status register, if the status valid bit has not been set in said register file; and
(g) thereafter, setting the status valid bit in said register file.

3. A peripheral controller for a data processing system, the data processing system including a central processing unit (CPU) coupled to the peripheral controller and at least one peripheral device coupled to the controller, the peripheral controller comprising:

a data buffer responsive to said CPU for transmitting and receiving over a data bus data information to and from the CPU and the one peripheral device;
a register file addressable by the CPU for accessing information stored in said register file under the control of the peripheral controller and supplying said information through said data buffer to said CPU on said data bus,
the register file including a plurality of registers for storing data in certain register locations;
means for detecting if information stored in said register file has been read by said CPU; and
logic means coupled to the register file and communicating with said CPU for providing an interrupt signal thereto, wherein the register file comprises three interacting registers (i) an interrupt enable register;
(ii) a status register:
(iii) a status overflow register for indicating that the peripheral controller could not report status information during its operation because the CPU had not acknowledged the retrieval of previously reported status, each of these interacting registers having a plurality of bit locations, each of the bit locations of each respective interacting register having corresponding bit locations in the other two interacting registers, and wherein said logic means includes interrupt signal generating means responsive to said interacting registers for supplying an interrupt signal to said CPU.

4. The peripheral controller of claim 3 in which the logic means is coupled to each of said interacting registers.

* * * * *